United States Patent Office 3,409,548
Patented Nov. 5, 1968

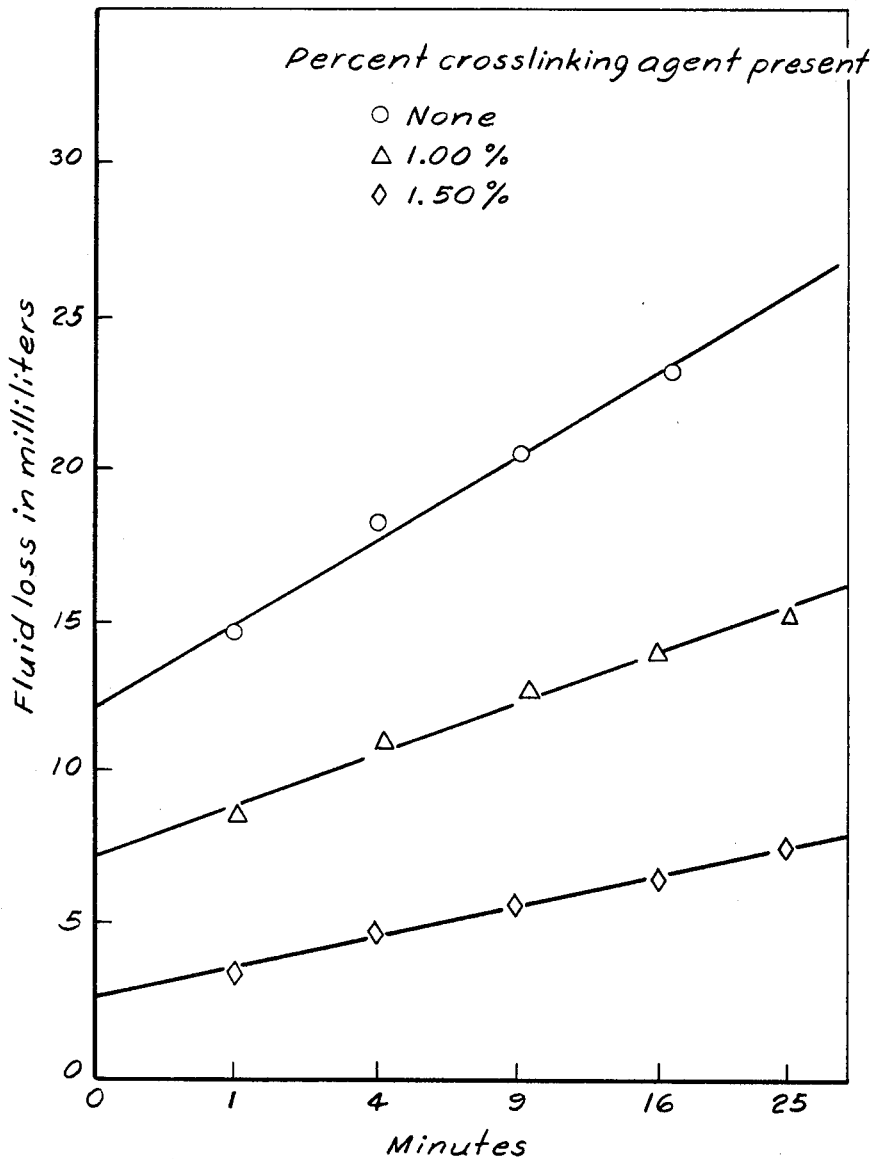

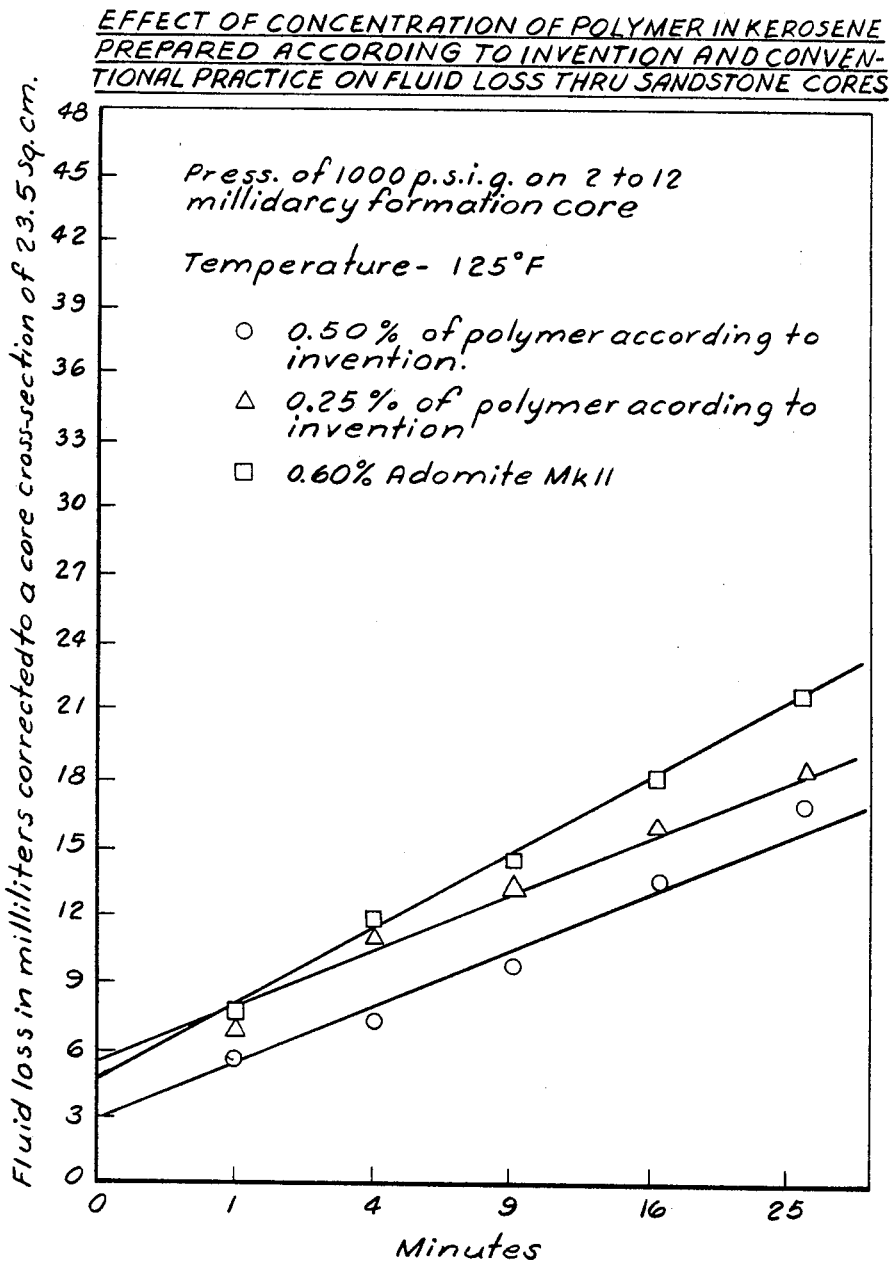

3,409,548
FLUID LOSS CONTROL IN WELL TREATMENTS
Billy G. Harper, Lake Jackson, Tex., and Charles F. Smith, Tulsa, Okla., assignors to The Dow Chemical Company, Midland, Mich., a corporation of Delaware
Filed Oct. 7, 1964, Ser. No. 402,116
8 Claims. (Cl. 252—8.55)

ABSTRACT OF THE DISCLOSURE

A cross-linked copolymer of an alpha-olefin and sulfur dioxide is admixed with an oil-base fracturing fluid and the so modified fracturing fluid is injected into a formation being fractured whereby the fluid loss to the formation is lessened due to the presence of the copolymer.

---

The invention relates to an improved method of treating a subterranean formation penetrated by a well, employing a fluid treating composition. The improvement resides in a selected additive to the composition which provides control of the amount of treating composition lost to the formation during treatment.

The wells herein concerned are those which are drilled into subterranean formations for the purpose of producing fluids, e.g. water, gas, oil, brine, or solubilizable solids, of which various salt deposits are illustrative, from the formation. Such production is often susceptible to being enhanced by treatment of the formation which usually comprises injecting, down the well and into contact with the formation, any one or more of various compositions, such treatment usually being referred to broadly as a well treatment.

Illustrative of such treatment is that known as hydraulic fracturing which comprises injecting a fluid, which is either a liquid or a liquid-gas mixture, at sufficient pressure to cause fracturing of formation rock, usually thought of as a sort of wedge-shaped progressive separation of formation rock. The fracturing may progress in an outward direction (dependent upon the interplay of natural sources, rock structure, and mode of injectoin) from the pressure points at which the fluid enters the formation, i.e., they may be in a vertical, horizontal, or any resultant diagonal direction. As is to be expected, the fracture pattern produced may comprise serpentine as well as occasionally more-or-less straight fractures and of varying cross-section, shape, and extent. The fluid employed is commonly an oil-base, aqueous-base, or emulsion-type liquid. Fracturing fluids commonly contain an oil-immiscible, water-immiscible granular material, e.g., 20 to 60 mesh sand, to provide a fluid-permeable propping agent when depostied in the fractures created.

Since most subterranean fluids to be produced exist in porous formations, a problem associated with successful hydraulic fracturing is loss, through seepage, of fracturing fluid into the formation pores. As injection of fracturing fluid continues during treatment, some of the energy which it is desired to build up to the point necessary to create a rock separation in the formation, is dissipated.

There has, consequently, been a number of attempts made over the years, during which more economic and efficient production of fluids from subterranean formations have been sought, through the lessening or control of the loss of treating fluids during well treatments. Salient of such attempts has been the addition of various agents which, when present in such fluids, desirably inhibit the fluid loss. Many such agents have been tried but a surprisingly few number have been shown to be acceptable additives for the intended purpose and none of which has, as yet, been a fully satisfactory answer to the problem.

For example, clays and various organic thickening agents, which have been heretofore suggested and used, tend to cause formation damage and, at least in part, defeat the objective of facilitating production. Accordingly, a need for an improved method of treating wells continues.

The invention meets this need by providing an improved hydraulic fracturing method which employs a highly effective fluid-loss control agent heretofore unknown for such purpose.

The method of the invention encompasses improved hydraulic fracturing of a subterranean formation which comprises forcing back into the formation, at sufficient pressure to fracture the formation, a fluid composition comprising an oil-base liquid having intermixed therewith a cross-linked copolymer of an alpha-olefin and sulfur dioxide in an amount of between about 0.01 and about 10.0 percent, based on the weight of the oil-base liquid, said copolymer being insoluble in but swellable by said oil-base liquid.

The sulfur dioxide and $\alpha$-olefin copolymer, sometimes referred to as a polysulfone, may be prepared according to the discussions in published literature, e.g., U.S. Patents 2,136,389 and 2,602,787 and in the J. A. Chem. Soc., vol. 65, pages 2417 and 2418 (1943).

The polymers suitable for the practice of the invention are those resulting from the polymerization of sulfur dioxide and $\alpha$-olefins of from $C_8$ to about $C_{42}$ (carbon atoms per molecule) range. $\alpha$-Olefins which are not liquid at normal temperature and pressure may be melted prior to use, dissolved in an aromatic solvent, e.g. benzene, or mixed with a sufficient amount of lower liquid $\alpha$-olefins to result in a liquid mixture. Although, as stated above, any $C_8$ to $C_{42}$ $\alpha$-olefin or mixture thereof, which is liquid or solution at the temperature of polymerization, is satisfactory, attempts to make a satisfactory polymer employing substantially all $C_6$ to $C_8$ mixture of $\alpha$-olefins were not satisfactory. Accordingly, for the practice of the invention the $\alpha$-olefin employed should be predominantly between $C_8$ and $C_{42}$ (preferably $C_8$ to $C_{20}$) although minor amounts of shorter carbon length $\alpha$-olefins may be present.

A motor ratio of $SO_2$ to the $\alpha$-olefin of from about 2 to about 32 may be employed in the preparation of the polymer. The polymer employed in the invention has a molecular weight of between about $1 \times 10^5$ and about $2 \times 10^6$.

The polymerization is carried out in a liquid, employing an excess of liquid $SO_2$ as the reaction medium. Alternatively, an inert solvent such as kerosene or hexane can be used. Polymerization can be effected by aid of irradiation or by the presence of a chemical catalyst.

When irradiation is employed, the amount of radiation used is from about 0.2 to about 1.0 megarad. Any convenient source of gamma rays or high velocity electrons is satisfactory. The rate of radiation may be varied within known practical limits. A cross-linking agent may optionally be present if it is desired to conserve the irradiation used. A chemical catalyst may also optionally be present to supplement polymerization by irradiation, if desired. However, irradiation without aid of cross-linking agent or chemical catalyst is a fully satisfactory procedure for effecting polymerization of the $SO_2$ and $\alpha$-olefin mixture.

Among chemical catalysts to employ to prepare the polymer are ionic-type catalysts, e.g. $AgNO_3$, $LiNO_3$, and $NH_4NO_3$ (sometimes referred to as a re-dox catalyst) and the peroxide-type free-radical initiating catalysts, e.g. methyl ethyl ketone peroxide. When an ionic-type is employed, the amount is usually from about 0.001 to about 0.5 percent and when the free-radical initiating type is employed, the amount is usually from about 0.05 to 5.0 percent, based on the weight of $\alpha$-olefin present.

Cross-linking agents which may be employed include the divinyl, diallyl, and diene types, e.g. divinyl ether of diethyleneglycol, methylenebisacrylamide divinylbenzene, diallyl carbonate, diallyl ether, and diolefins. In some instances, commercially available α-olefins contain small but adequate amounts of a cross-linking agent, as an impurity, to promote cross-linked polymerization in the presence of a chemical catalyst or when subjected to irradiation. For example, $C_8$ α-olefins often contain sufficient 1,7-octadiene to provide cross-linking when polymerized. Additional cross-linking agent may, of course, be added to supplement that already present, if desired.

The amount of cross-linking agent employed varies according to the α-olefin, cross-linking agent, and the catalyst being employed. Usually, a cross-linking agent in an amount of from about 0.01 to about 5.0 percent by weight, based on the weight of the α-olefin present, is used. The preferred amount of cross-linking agent to employ is from about 0.03 to about 2.0 percent, of the weight of the α-olefin.

It is preferred that the composition so prepared be subjected to the shearing action provided by an homogenizer, blender, colloid mill, or pump to produce a more homogeneous mixture. Standing prior to use has also been found to give a more homogeneous mixture. The shearing action which results from the high pressure pumping commonly employed for injection of a fluid down a well contributes very satisfactorily to the uniformity of the mixture. It will be seen, therefore, that the desired shearing may be taken care of during the injection of the composition down the well employing commonly used pumping systems.

The oil-base treating liquid may be any liquid hydrocarbon. It is usually crude petroleum oil or a fraction thereof, e.g., Diesel oil, kerosene, naphtha, gas oil, or such oils emulsified with water by use of an emulsifying agent or gelled by admixture therewith of a suitable gelling agent, e.g., a natural or synthetic gum.

Fracturing of a formation according to the method of the invention is carried out by injecting the fracturing liquid containing the α-olefin-$SO_2$ polymer down the well-bore of a well penetrating the formation, at a pressure (as shown by recording instruments) sufficient to fracture the formation. Pressure on the well may thereafter be released and the well put in production.

The oil-base liquid may, if desired, have sufficient gas present therein to provide liquid and gas phases at the level of treatment, such gas being of the nature of gaseous hydrocarbons, nitrogen, the inert gases, or carbon dioxide. There is also desirably present a propping agent, as for example, a particulate mineral, preferably sand, of the mesh size hereinabove suggested.

To illustrate the practice of the invention, the following examples were performed:

Example 1

A sample of about 250 milliliters of a mixture of α-olefins, consisting predominantly of $C_9$ to $C_{11}$ α-olefins, was cooled to —15° C. Into this material were introduced about 500 grams of liquid sulfur dioxide and the temperature thereafter raised and maintained at about 25° C. This mixture was exposed to gamma radiation emitted by a cobalt-60 source for 45 minutes at a dosage rate of 0.21 megarad per hour for a total dose of 0.16 megarad. Polymerization of the mixture was completed at that time. The excess $SO_2$ was evaporated and the yield of cross-linked, insoluble polymer was ascertained to be 200 grams. The polymer was a yellowish-brown colored rubbery solid. Portions of the solid so made were pulverized and admixed with kerosene in varying amounts of between 0.15 and 6.0 percent. The kerosene was imbibed by the polymer, forming a particulate gel.

Example 2

In accordance with the general procedure of Example 1, 150 milliliters of an α-olefin mixture, consisting predominantly of $C_{12}$ to $C_{14}$ α-olefins, were admixed with 300 grams of liquid sulfur dioxide and the resulting mixture subjected to the radiation emitted by a cobalt-60 source for one hour at the same dosage rate as that of Example 1 to a total dose of 0.21 megarad. A clear rubbery cross-linked solid polymer was formed. Analysis of the polymer showed that the proportion of $SO_2$ groups to the α-olefin was 1:2. The polymer so made was pulverized and portions thereof were admixed with kerosene and with hexane, in amounts of between 3 and 4 percent of the polymer, based on the weight of the kerosene or hexane. The polymer was insoluble but swellable in these solvents. Both the kerosene and the hexane were thereby converted to particulate gels.

Example 3

A polymer-kerosene composition was prepared according to Example 2, wherein 2 percent of polymer by weight of kerosene was employed. The gelled composition so made was sheared in a blender for three minutes. A blank, i.e. kerosense with no additive, and the thus sheared composition were each then placed successively in a standard fluid-loss apparatus of the type employed in API RP 39, Section V. The apparatus was provided with a number of 50 Whatman filter paper. The 2 percent composition tested showed a fluid loss of 7.8 milliliters in 30 minutes in contrast to a complete loss of all the kerosene in a few seconds when no additive was present. The example was repeated employing the same pulverized polymer as was employed in Example 2 except that 0.5 percent and 0.25 percent of each of the sulfur dioxide and α-olefin polymer were separately employed. The presence of the 0.5 percent polymer gave a fluid loss of 13.3 milliliters in 30 minutes and the 0.25 percent polymer composition gave a fluid loss of 25.1 milliliters in 30 minutes. The example was again repeated employing 2.0 percent of the polymer in hexane as the organic liquid. Substantially the same results were obtained when hexane was used as when kerosene was employed.

The results of Example 3 show conclusively that the composition of the invention provides excellent fluid loss control in accordance with the standard test employed in the industry.

Example 4

In the manner of Example 2, two mixtures of $C_{12}$ to $C_{14}$ alpha-olefins and $SO_2$ were reacted by irradiating with a total dose of 0.21 megarad, except that the polymerizing mixtures contained 1.0 and 1.5 percent by weight, respectively, of the divinyl ether of diethyleneglycol as a cross-linking agent. Each of the two polymers so prepared and the ploymer prepared in Example 2, were independently placed in kerosene at 0.25 percent concentration and tested in the manner of Example 3 for fluid loss. The comparative results are shown in the graph of FIGURE 1. Reference to the graph of FIGURE 1 shows that the presence of the cross-linking agent resulted in a polymer which imparted greater reduction in fluid loss to the kerosene, and that 1.5 percent of the cross-linking agent in the polymerization mixture was more effective than 1.0 percent.

Example 5

This example was run to show that the efficacy of the method of the invention shows comparable improvement as a fluid loss agent, to that obtained by shearing, when the composition has been allowed to stand for a time prior to use. A polymer prepared as described in Example 4 (wherein 1.0 percent divinyl ether of diethyleneglycol was employed) was admixed with kerosense according to the invention, in the amount of 0.125 percent by weight of the kerosene and allowed to stand without agitation of any kind for a period of 240 hours. Fluid loss tests according to API RP 39, Section V, were run at the end of that period. The polymer composition which had been allowed to stand showed a fluid loss at the end of 30 minutes of 6 milliliters whereas that which had not been allowed to stand showed a fluid loss at the end of 30 minutes of 26 milliliters.

Example 6

An alpha-olefine mixture consisting essentially of $C_{12}$ to $C_{16}$ species was reacted with a molar excess of $SO_2$ in the presence of 3.2 percent methyl ethyl ketone peroxide catalyst and 1.05 percent diallyl carbonate as a cross-linking agent.

A standard, high-pressure fluid loss test employing sandstone cores was run using two concentrations of the gelled composition of this polysulfone in kerosene. The test was made at a pressure of 1000 p.s.i.g. on a 2 to 12 millidarcy core sample at a temperature of 125° F. A comparative run was made employing Adomite MK II, a fluid loss additive commonly used in oil well fracturing treatments at the present time. The concentration of the Adomite MK II was 0.6 percent, while the polysulfone was used at 0.25 and 0.50 percent concentration, based on weight of kerosene. The results are shown in the graph of FIGURE 2, corrected to a core cross-section of 23.5 cm².

Reference to the graph of FIGURE 2 shows that the practice of the invention achieves superior results in reducing fluid loss from a sandstone core than those achieved when employing a widely used fluid loss additive, even though less than half the additive was employed in the practice of the invention.

Example 7

A mixture of alph-olefins, consisting essentially of $C_{16}$ to $C_{20}$ species, was reacted with a molar excess of $SO_2$ in the presence of about 0.02 percent silver nitrate catalyst and about 0.07 percent 1,7-octadiene as a cross-linking agent. The resulting polysulfone was tested as a fluid-loss control agent, employing 2 to 12 millidarcy Bandera sandstone cores, as in Example 6. The gelled composition employing the polymer so made was found to be substantially as effective as that employed in Example 6.

Example 8

In the manner of Example 7, a polysulfone was made using the same olefin mixture and catalyst concentration as in Example 7, except that 1.5 percent of 1,7-octadiene was present as the cross-linking agent. The resulting polymer pulverized to 50 mesh size, and 325 mesh size propping sand were admixed with kerosene in the amount of 40 pounds of each per 1000 gallons of kerosene. The resulting gelled composition was tested similarly to Example 6 above (1000 p.s.i.g. and 125° F.) in 200 to 250 millidarcy Berea sandstone core samples. The loss of fluid at periodic time intervals is shown in Table I.

TABLE I

| Time, min.: | Total fluid loss in milliliters |
|---|---|
| 1 | 1.6 |
| 4 | 2.1 |
| 9 | 2.6 |
| 16 | 3.0 |
| 25 | 3.3 |

Example 9

Using the same test as in Example 7, a similarly prepared polymer, but containing 0.037 percent of the cross-linking agent employed in preparing the polymer tested in Example 7, at a concentration of 25 pounds of polymer and 25 pounds of 325 mesh sand per 1000 gallons and at a temperature of 200° F. gave a total fluid loss of only 1.6 milliliters after 25 minutes.

Example 10

A polymer was prepared by admixing 335 grams of liquid $SO_2$ with a 100 gram mixture of α-olefins having the following carbon atom per molecule ranges: 50% of $C_{16}$ to $C_{20}$, 38% of $C_{22}$ to $C_{26}$, and 12% of $C_{28}$ to $C_{42}$. Sufficient diolefin was present in the mixture to serve as cross-linking agent. Although the higher molecular weight of α-olefins alone are solid at room temperature, when mixed with the lower molecular weight α-olefins were completely dissolved resulting in a liquid mixture. With these $SO_2$-α-olefin mixture was admixed 1 milliliter, aqueous solution (0.024 gram of solids) $AgNO_3$ as a catalyst. The polymerization was carried out at room temperature (77° F.) after removing excess $SO_2$ by evaporation, and drying and pulverizing the polymer so made, it was admixed with kerosene in the amount of 2% by weight. The resulting gelled composition was tested for fluid loss properties in comparison to kerosene alone, according to API RP 39 Section V, and showed a fluid loss reduction comparable to that achieved in Example 5 above.

Example 11

The following example is illustrative of treating a fluid-bearing formation traversed by a well in accordance with the invention.

A sulfur dioxide-α-olefin polymer, employing a molar excess of the sulfur dioxide, is prepared as above described, e.g., that of Example 1 or Example 6. The polymer so made is admixed with Diesel oil in an amount of say 2 percent, based on the weight of the oil. The resulting gelled oil is then pumped down the wellbore of the well, employing conventional fracturing equipment and techniques, at a pressure, as shown by suitably positioned indicators, to fracture the formation. The injection at fracturing pressures may be repeated if desired. The pressure on the well is then released and the so injected oil allowed to flow from the well until there has been sufficient drop in pressure for equilibrium to exist. It is usually preferred that an inert inorganic oil-insoluble particulated propping agent be admixed with the gelled oil prior to, or preferably during, injection to aid in propping open the fractures created. When the well is put into production following treatment, the fractures thus created increase the rate and quantity of fluid produced.

Having described our invention what we claim and desire to protect by Letters Patent is:

1. The method of fracturing a subterranean formation penetrated by a wellbore which comprises injecting down the wellbore and back into the formation, at a pressure sufficient to fracture the formation, an oil base fluid comprising (A) an oil-base liquid selected from the class consisting of crude petroleum oil, diesel oil, kerosene, naphtha, gas oils, mixtures of hydrocarbon liquids, and water and oil emulsions and (B) between 0.01 and 10% by weight of the fluid of a cross-linked polysulfone particulated polymer, having a molecular weight of between about $1 \times 10^5$ and about $2 \times 10^6$, prepared by copolymerizing a copolymerizable mixture of sulfur dioxide and a $C_8$ to $C_{24}$ alpha-olefin, in a molar ratio of sulfur dioxide to alpha-olefin of between about 2 and about 32, by subjecting the mixture to polymerization conditions consisting of one of:

(1) exposing the copolymerizable mixture to between about 0.2 to 1.0 megarad of high energy irradiation;

(2) admixing with the copolymerizable mixture
   (a) between about 0.01 and 5.0 percent, based on the weight of alpha-olefin present, of a cross-linking agent selected from the class consisting of divinyl ether of diethyleneglycol, methylenebisacrylamide, divinylbenzene, diallyl carbonate, diallyl ether, and diolefins, and
   (b) between about 0.001 and 5.0 percent based on the weight of alpha-olefin present, of a catalyst selected from the class consisting of re-dox and free radical initiating catalysts and maintaining the resulting mixture at reaction temperature until copolymerization is substantially complete, (3) combining (1) and (2)(a) by exposing the copolymerizable mixture containing the cross-linking agent to irradiation, (4) combining (1) and (2)(b) by exposing the copolymerizable mixture containing the catalyst to irradiation, and (5) combining (1) and (2) by exposing the copolymerizable mixture containing both said cross-linking agent and said catalyst to irradiation.

2. The method according to claim 1 wherein the α-olefin employed is a mixture thereof which is liquid at room temperature.

3. The method according to claim 1 wherein the α-olefin employed is a mixture thereof which is rendered liquid by heating above room temperature.

4. The method according to claim 1 wherein the α-olefin is a mixture thereof which is dissolved in an aromatic solvent to provide a solution thereof and the α-olefin is admixed in solution with the $SO_2$.

5. The method according to claim 1 wherein the oil-base liquid containing the polymer is subjected to shearing prior to being forced into the formation.

6. The method according to claim 1 wherein the oil-base liquid containing the polymer is allowed to stand for at least eight hours prior to being forced into the formation.

7. The method according to claim 1 wherein the polymer is employed in an amount of between about 0.1 and about 5.0 percent, based on the weight of the fluid.

8. The method according to claim 1 wherein the α-olefin is selected from the class consisting predominantly of α-olefins containing between 8 and 20 carbon atoms per molecule and mixtures thereof and wherein the molar proportion of sulfur dioxide to the α-olefin is at least 4.

References Cited

UNITED STATES PATENTS

| | | | |
|---|---|---|---|
| 2,136,389 | 11/1938 | Marvel et. al. | 260—79.3 |
| 2,602,787 | 7/1952 | Crouch | 260—79.3 |
| 3,065,172 | 11/1962 | Groves et al. | 252—8.55 |
| 3,252,904 | 5/1966 | Carpenter | 252—8.55 |

LEON D. ROSDOL, *Primary Examiner.*

H. B. GUYNN, *Assistant Examiner.*